United States Patent [19]
Lauter

[11] Patent Number: 6,046,914
[45] Date of Patent: Apr. 4, 2000

[54] AC/DC CONVERTER

[75] Inventor: Josef Lauter, Geilenkirchen, Germany

[73] Assignee: U.S. Philips Corporation, New York, N.Y.

[21] Appl. No.: 09/320,621

[22] Filed: May 26, 1999

[30] Foreign Application Priority Data

May 30, 1998 [DE] Germany .................. 198 24 409

[51] Int. Cl.[7] .................................................. H02M 5/45
[52] U.S. Cl. ........................ 363/37; 363/125; 363/131
[58] Field of Search ............................. 363/34, 37, 125, 363/127, 16, 81, 89, 131

[56] References Cited

U.S. PATENT DOCUMENTS

| | | | |
|---|---|---|---|
| 5,301,095 | 4/1994 | Teramoto et al. | 363/21 |
| 5,563,777 | 10/1996 | Miki et al. | 363/37 |
| 5,657,212 | 8/1997 | Poon et al. | 363/17 |
| 5,668,707 | 9/1997 | Barrett | 363/44 |
| 5,798,630 | 8/1998 | Sugimori et al. | 320/137 |
| 5,875,107 | 2/1999 | Nagai et al. | 363/131 |
| 5,959,849 | 9/1999 | Batarseh et al. | 363/16 |

OTHER PUBLICATIONS

"A comparison of Half–Bridge Resonant Converter Topologies", by Robert L. Steigerwald, in IEEE Transactions on Power Electronics, vol. 3, No. 2, Apr. 1988, pp. 174–182.

Udo Leonhard Thiel, "Professionelle Schaltnetzteilapplikationen", Franzis–Verlag, 1996, Chapter 3.9, 2 pages.

*Primary Examiner*—Adolf Deneke Berhane
*Attorney, Agent, or Firm*—Edward W. Goodman

[57] ABSTRACT

To provide an AC/DC converter including a resonant converter which reliably supplies a constant DC power supply voltage ($U_{out}$) in a wide output power range, while using a minimal number of components, and in which the input impedance of the AC/DC converter should have a minimal reactive impedance, both a capacitive (C2) and an inductive (n3) coupling of the resonant converter (8) to a point (5) between the resonant converter (8) and a rectifier arrangement (1) is provided. The rectifier arrangement is used for rectifying an AC voltage ($U_{in}$) applied to the AC/DC converter.

9 Claims, 6 Drawing Sheets

AC/DC CONVERTER

BACKGROUND OF THE INVENTION

1. Field of the Invention

The invention relates to an AC/DC converter comprising a resonant converter.

Such AC/DC converters are used for converting an alternating voltage into a direct voltage in, for example, television apparatuses or discharge lamps in the form of switched-mode power supplies so as to convert a line voltage into a DC power supply voltage.

2. Description of the Related Art

An AC/DC converter which loads a public AC voltage line is subject to particular requirements as regards the current which may be taken from the AC voltage line. For example, the current taken up by the AC/DC converter may customarily have only a limited harmonic part, i.e., the AC/DC converter should essentially operate as an active resistance. The impedance part of the input impedance of the AC/DC converter should not exceed given values. Such requirements are further specified in, for example, IEC 1000-3-2.

It is known from the book by Udo Leonhard Thiel "Professionelle Schaltnetzteilapplikationen", Franzis-Verlag, 1996, chapter 3.9, to use resonant converters for increasing the power density of switched-mode power supplies (the ratio between output power and apparatus volumes). It is based on the recognition to include an LC resonant circuit in the primary circuit of a switched-mode power supply, which, when necessary, is charged for a given time interval and discharged again in the same time interval. Power supplies realized by means of a resonant converter have a smaller volume, an improved reliability and reduced EMV emissions.

Various topologies for resonant converters with half-bridge circuits are known from the thesis by Robert L. Steigerwald "A Comparison of Half-Bridge Resonant Converter Topologies", IEEE Transactions on Power Electronics, vol 3, no. 2, April 1988, pp. 174 to 182.

SUMMARY OF THE INVENTION

It is an object of the invention to provide an AC/DC converter comprising a resonant converter which reliably provides a constant DC power supply voltage in a wide output power range, while using a minimal number of components, and in which the input impedance of the AC/DC converter has a minimal reactive impedance.

This object is achieved by means of an AC/DC converter comprising a first rectifier arrangement for generating a rectified AC voltage from an AC voltage at an input of the AC/DC converter, a first smoothing capacitor arrangement for smoothing the rectified AC voltage, a resonant converter comprising resonant circuit elements for converting the voltage at the first smoothing capacitor arrangement into a DC output voltage at the output of the AC/DC converter, an inductive element arranged between the first rectifier arrangement and the first smoothing capacitor arrangement, this inductive element being magnetically coupled to an inductive resonant circuit element, and a capacitive coupling of a point between the first rectifier arrangement and the first smoothing capacitor arrangement to a point within the resonant converter, such that a potential modulated at the operating frequency of the resonant converter is fed back during operation of the AC/DC converter.

When the magnetic and, hence, inductive coupling by the inductive element and said capacitive coupling is activated, the resonance frequency of the resonant converter is maintained substantially constant because the influences of the inductive and capacitive coupling on the resonance frequency cancel each other. Characteristic fields of the resonant converter used for determining the operating point change to an inessential extent only. Such an AC/DC converter has the advantage that the operating frequency at fixed output power can be maintained substantially constant. The required bandwidth of a control arrangement for maintaining the DC output voltage is then smaller and the ripple of the DC output voltage is reduced effectively.

The AC/DC converter according to the invention is provided for wide output power ranges. A small number of components is required for realizing the magnetic (inductive) and capacitive coupling. In the load state, the AC/DC converter takes up a substantially sinusoidal input current which is substantially in phase with the AC voltage at the input, which is usually a line voltage, so that the AC/DC converter has a very low reactive impedance and thereby operates as a pure resistance in a good approximation of a load.

When booster means are provided, the booster means causing a voltage at the first smoothing capacitor arrangement to be stepped up with respect to a corresponding rectified AC voltage supplied by the first rectifier arrangement, a continuous charging of the smoothing capacitor arrangement is no longer required to maintain it at the required voltage value.

There are various possibilities of realizing the booster means. One possibility is to provide a booster coil which is arranged in series with the inductive element arranged between the first rectifier arrangement and the first smoothing capacitor arrangement. The realization by means of the booster coil representing a separate component, has the advantage that the conversion of the booster means at a predetermined dimensioning is independent of other components of the circuit arrangement. Another possibility is to realize the booster inductance of the booster means by means of a leakage inductance of the inductive element arranged between the first rectifier arrangement and the first smoothing capacitor arrangement. No separate booster coil is required in this implementation. Instead, said inductive element is dimensioned in such a way that it has an appropriate leakage inductance. To this end, a transformer (which is regularly used in switched-mode power supplies) provided in the resonant converter and having a winding for realizing the inductive element is implemented and dimensioned, accordingly.

In a further embodiment of the invention, the resonant converter comprises switching elements which in a first switching state, apply the voltage at the first smoothing capacitor arrangement, via the resonant circuit elements, to the primary side of a transformer whose secondary side is coupled to the output of the AC/DC converter via a second rectifier arrangement and a second smoothing capacitor arrangement, and in a second switching state, decouple the first smoothing capacitor arrangement from the primary side of the transformer without the resonant circuit elements being decoupled from the primary side of the transformer.

Such an implementation by means of a half-bridge circuit is a more appropriate and more favorable low-cost solution for switched-mode power supplies as compared with a realization by means of a full-bridge converter. By means of the transformer, a DC separation of the input circuit and the output circuit of the AC/DC converter is achieved. The use of a transformer also increases the DC output voltage and output power range that can be generated.

If the inductive element is arranged in series with the capacitor arrangement realizing the capacitive coupling, it is always ensured, without any further measures, that the capacitive coupling can only work together with the inductive coupling through the inductive element in all operating states.

In a preferred realization of the circuit arrangement, one terminal of the circuit branch realizing the capacitive coupling is coupled to a point between the primary winding of the transformer and the capacitive resonant circuit element of the resonant converter. The other terminal of this circuit branch is coupled to a point between the booster coil and the booster diode of the booster means. In this way, a potential of the resonant circuit of the resonant converter, which is modulated at the switching frequency of the switching elements, is coupled out and applied to the booster means. In another realization of the circuit arrangement, one terminal of the circuit branch realizing the capacitive coupling is coupled to a point between the primary winding of the transformer and another inductive resonant circuit element of the resonant converter, and the other terminal of this circuit branch is connected to a point between the booster coil and the booster diode of the booster means. In this variant, no purely capacitive circuit can be obtained which comprises the capacitive resonant circuit element and the capacitance realizing the capacitive coupling, so that current peaks, which may occur when a circuit state exists in a purely capacitive circuit, are avoided.

In a manner which is customary for switched-mode power supplies, control means are provided for maintaining the DC output voltage constant by adapting the switching frequency of the switching means so that a ripple of the DC output voltage is counteracted.

These and other aspects of the invention are apparent from and will be elucidated with reference to the embodiments described hereinafter.

DESCRIPTION OF THE PREFERRED EMBODIMENTS

Figure 1:
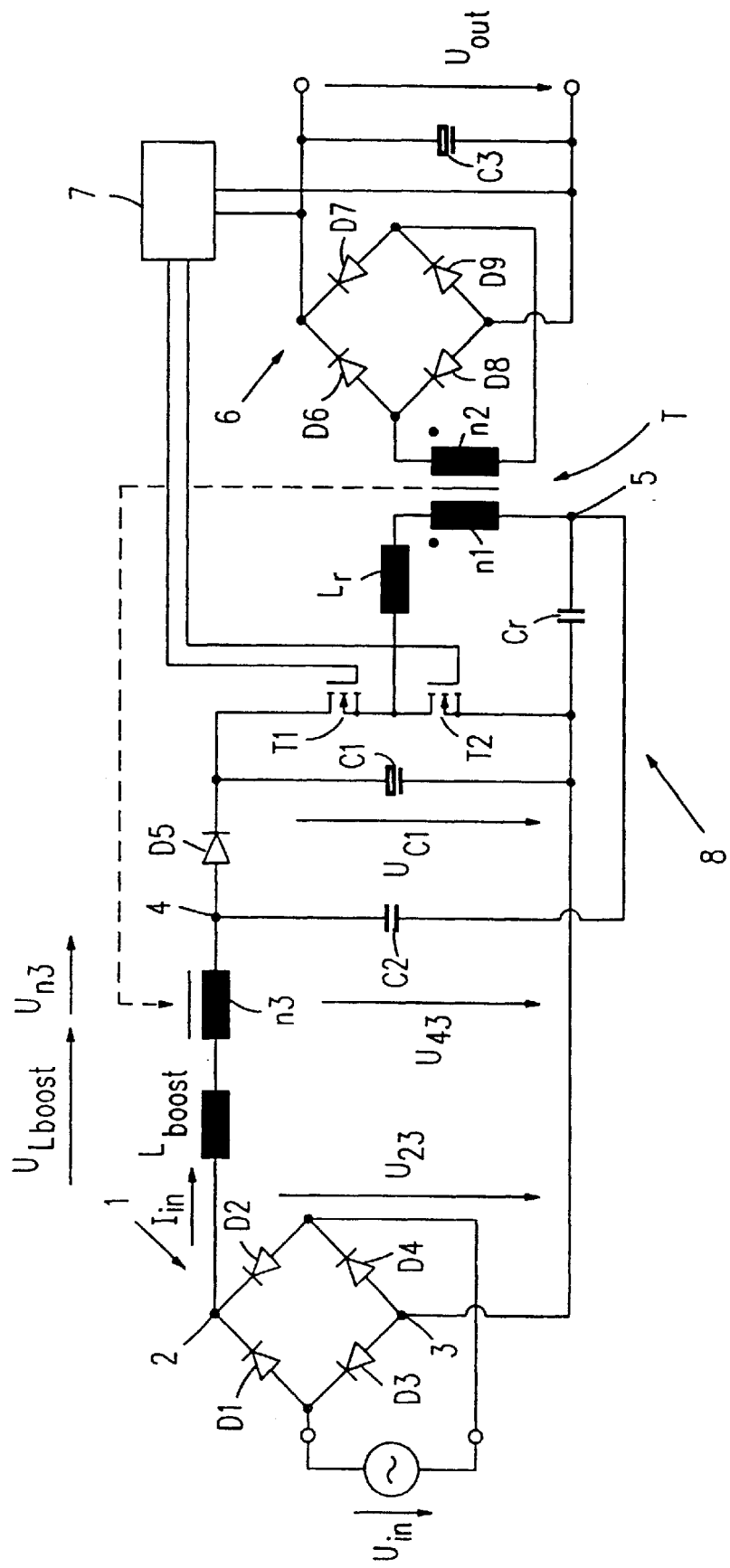
FIG. 1 shows an embodiment of the AC/DC converter according to the invention.

FIG. 1 shows an embodiment of the AC/DC converter according to the invention. The input of the AC/DC converter receives an AC voltage $U_{in}$ which is converted into a rectified AC voltage $U_{23}$ by means of a bridge rectifier 1 consisting of four diodes D1, D2, D3 and D4. The AC voltage $U_{in}$ is, for example, a sinusoidal 230 V line voltage at a frequency of 50 Hz. The voltage $U_{23}$ is tapped from the points 2 and 3 of the bridge rectifier 1. The voltage $U_{23}$ assuming positive values is directed from point 2 to point 3. The series arrangement of a coil $L_{boost}$, operating as a booster coil in this case, and a winding n3 of a transformer T further having a primary winding n1 and a secondary winding n2 is arranged between the point 2 and a point 4. The winding n3 is DC—separated from the windings n1 and n2 but a magnetic flux through the windings n1 and n2 flows at least partially through it. The series arrangement of a diode D5 and a smoothing capacitor arrangement consisting of a smoothing capacitor C1 is present between the point 4 and the point 3. The capacitor C1 is preferably an electrolytic capacitor. The anode of the diode D5 is connected to the point 4 and the cathode of the diode D5 is connected to the positive terminal of the capacitor C1.

Arranged parallel to the capacitor C1 is the series arrangement of two MOSFET transistors T1 and T2 of a resonant converter 8, these transistors operating as switches and implemented as blocking enhancement-type n-channel MOSFET transistors. The drain of the transistor T1 is connected to the cathode of the diode D5, and the source of the transistor T2 is connected to the negative terminal of C1 or point 3. Arranged parallel to the drain-source path of the transistor T2, is the series arrangement of a coil $L_r$, the primary winding n1 of the transformer T and a capacitor $C_r$, these components operating as elements of a resonant circuit so that a so-called LLC resonant converter is obtained. The coil $L_r$ is connected to the source of the transistor T1 and the drain of the transistor T2. The capacitor $C_r$ is connected to the source of the transistor T2. The winding n1 is situated between the coil $L_r$ and the capacitor $C_r$. A capacitor C2 is arranged at a point 5, which is situated between the winding n1 and the capacitor $C_r$, and at the point 4.

The voltage at the secondary winding n2 of the transformer T is applied to a bridge rectifier 6 consisting of diodes D6, D7, D8 and D9. The rectified voltage generated by the bridge rectifier 6 is applied to a smoothing capacitor arrangement consisting of a smoothing capacitor C3 which is arranged parallel to the output of the AC/DC converter and from which the output voltage $U_{out}$ is tapped.

The DC output voltage $U_{out}$ is applied to a control unit 7 which controls the switching states of the transistors T1 and T2 in such a way that the output voltage $U_{out}$ is maintained constant. To this end, the switching frequency of the transistors T1 and T2 is predetermined by the control unit 7 by generating appropriate gate voltages. The switching frequency is preferably in the range between approximately 50 and 400 kHz. The transistors T1 and T2 are alternately turned on. The control unit 7 comprises an opto-coupler for DC separation of its outputs connected to the gates of the transistors T1 and T2 and its inputs tapping the output voltage $U_{out}$, and a PI control means which influences the frequency of an oscillator in the control unit, from which the oscillator switching frequency of the transistors T1 and T2 is again derived.

The rectified AC voltage $U_{23}$ is stepped up to a voltage $U_{43}$. To this end, booster means are used comprising a coil $L_{boost}$ operating as a booster coil, the winding n3 and the diode D5. The switch of a booster is simulated through the winding n3 by the high-frequency AC voltage $U_{n3}$ induced in this winding and by the capacitive coupling through the capacitor C2. A voltage $U_{n3}$, corresponding to the part of the magnetic flux active in the transformer T and flowing through the winding n3, falls at the inductive element n3 between the bridge rectifier 1 and the smoothing capacitor C1. The capacitor C2 couples the point 4 between the bridge rectifier 1 and the smoothing capacitor C1 to the point 5 within the resonant converter 8, conveying a potential modulated at the operating frequency of the resonant converter 8. The frequency of the voltage $U_{n3}$ and the potential at point 5 is in the range of the switching frequency of the transistors T1 and T2. The sinusoidal variation shows that $L_r$, n1 and $C_r$ operate as resonant circuit elements and as such, convert the capacitor voltage $U_{c1}$ switched by means of the transistors T1 and T2 into a sinusoidal current through the primary winding n1 of the transformer T.

If the potential at point 4 is larger than the potential of the point between diode D5 and capacitor C1, the capacitor C2 operates as a charge pump and charges the capacitor C1. This process ensures that the capacitor C1 is sufficiently charged, also at a large consumption of output power $P_{out}$. When the voltage $U_{23}$ is larger than the sum of the voltages $U_{Lboost}$, $U_{n3}$ and the maximum value of the voltage $U_{43}$, an input current $I_{in} > 0$ flows. In this operating state, the envisaged operation of the inductive coupling through the winding n3 and the capacitive coupling through the capacitor C2 is realized. Both operate as resonant circuit elements in addition to the resonant circuit elements $L_r$, n1 and $C_r$. Their influence on the resonance frequency is, however, oppositely oriented and is compensated so that the resultant resonance frequency of the resonant converter remains substantially unchanged with respect to a circuit state with $I_{in}=0$ at which only the resonant circuit elements $L_r$, n1 and $C_r$ determine the resonance frequency of the resonant converter. This simplifies the control of the operating frequency f of the resonant converter with which the switching elements T1 and T2 are operated in the relevant case because the same family of characteristics can be used as a basis for a given output power $P_{out}$, both at $I_{in}=0$ and at $I_{in}>0$. The required bandwidth of the control unit 7 is minimized. The way in which families of characteristics are taken into account in the control of the operating frequency f is further described with reference to FIGS. 4 to 6.

Figure 2:
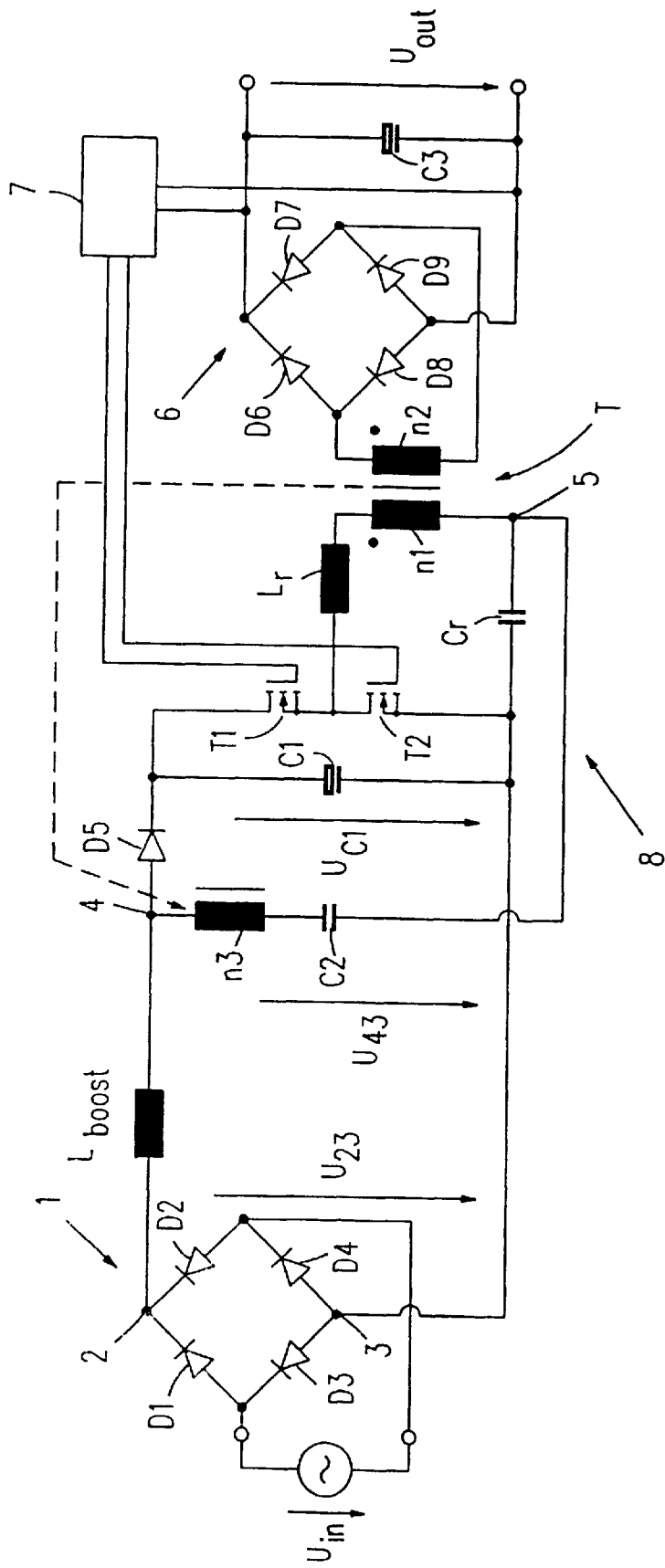
FIGS. 2 and 3 show further embodiments of the AC/DC converter according to the invention.
Figure 3:
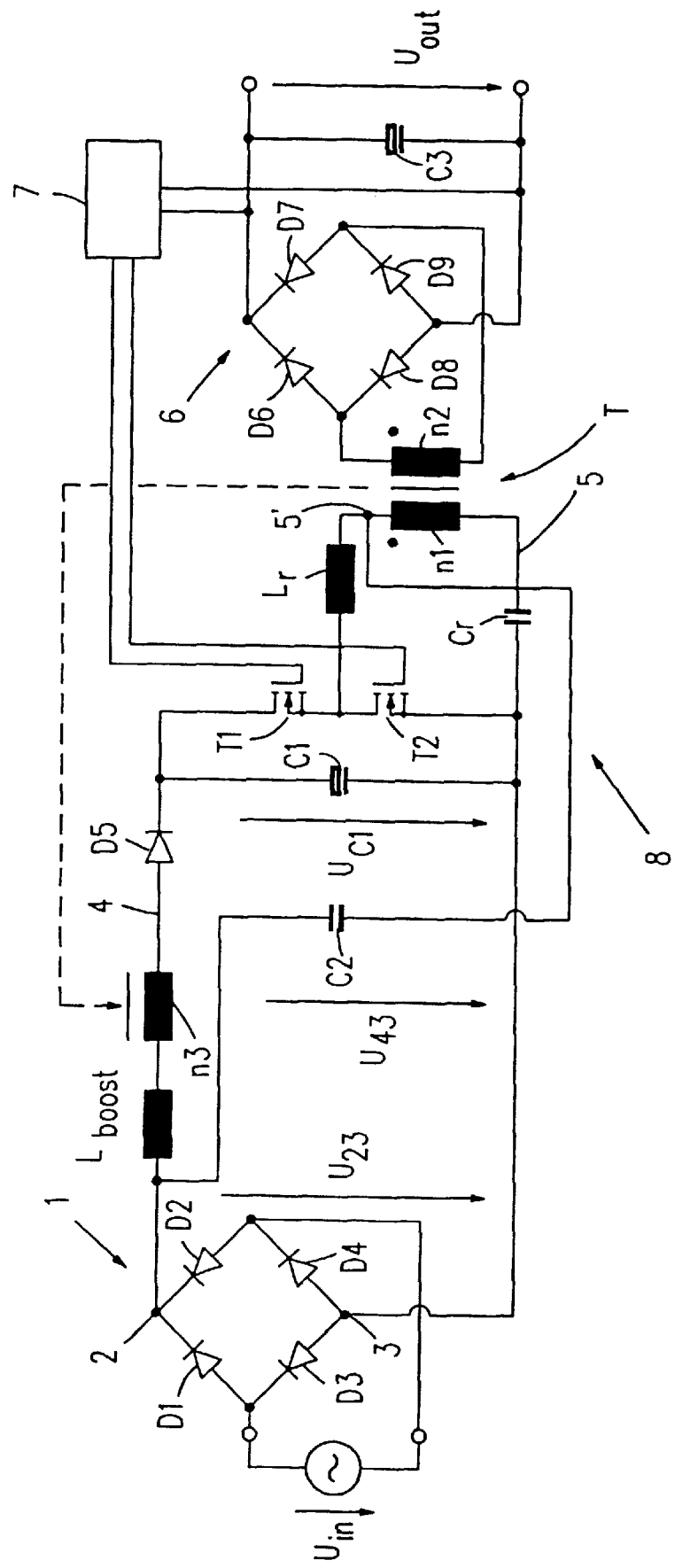

FIGS. 2 and 3 show variants of the AC/DC converter of FIG. 1. In FIG. 2, the winding n3 is not arranged in series with the booster coil $L_{boost}$, but in series with the capacitor C2 between this capacitor and point 4. It is thereby ensured that the inductive coupling through the winding n3 and the capacitive coupling through the capacitor C2 always work in common. FIG. 3 shows an embodiment in which two further possible variants of the AC/DC converter of FIG. 1 are used. In one of the two variants, the branch with the capacitor C2 realizing the capacitive coupling is not coupled to the point 4 but to the point 2. Furthermore, the circuit may be modified to such an extent that a potential 5', between the winding n1 and the inductance $L_r$ instead of the potential at point 5, is tapped from the branch with the capacitor C2 realizing the capacitive coupling. A circuit state in which there is a purely capacitive circuit comprising the capacitors $C_r$ and C2, which may lead to unwanted current peaks, is thus avoided.

Figure 4:
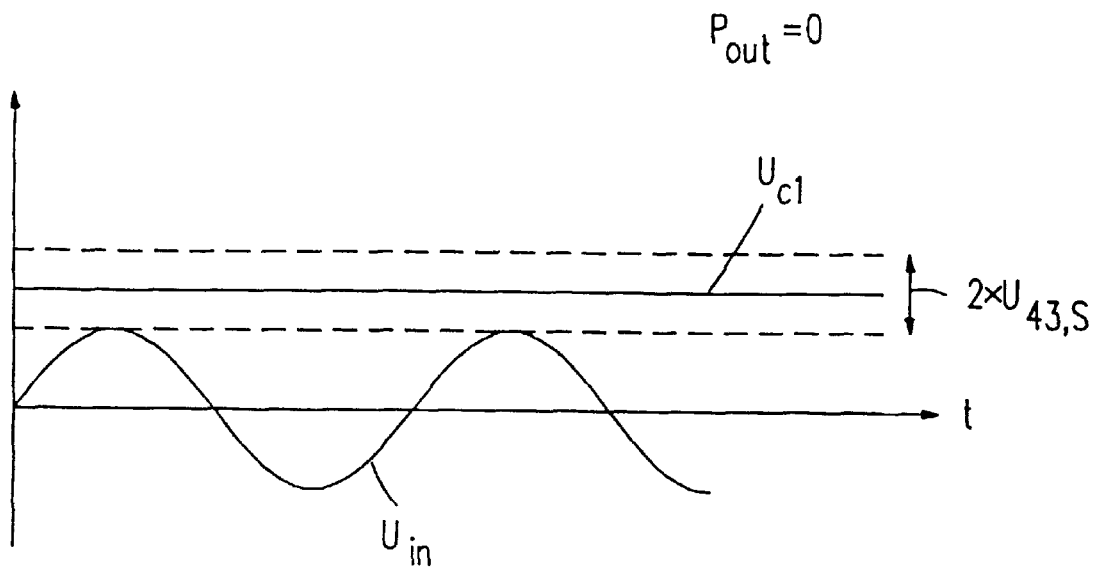
FIGS. 4 and 5 show voltage waveforms in AC/DC converters in the case of no-load at the output of the AC/DC converter and at maximum output power.
Figure 5:
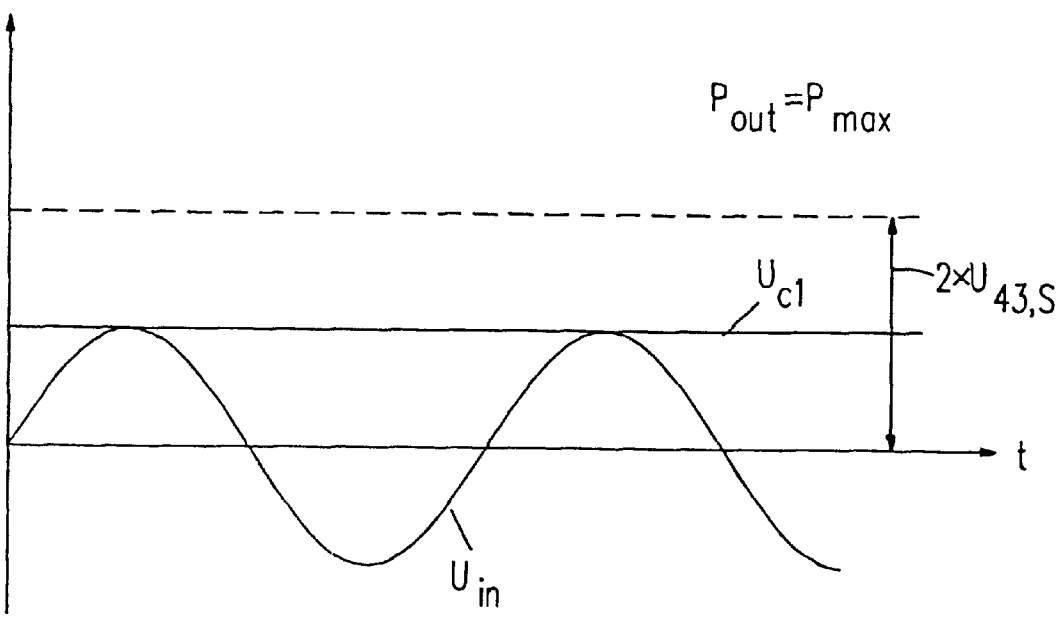

FIGS. 4 and 5 show the basic characteristic curves of the input voltage $U_{in}$ and the voltage $U_{C1}$ at the capacitor C1. They are to be read in conjunction with FIG. 6 which shows a diagram in which the ratio between the output voltage $U_{out}$ and the voltage $U_{c1}$ at the capacitor C1 via the switching frequency of the transistors T1 and T2 is shown for several output voltages $P_{out}=0$, $P_{out}=P1$ (for example, 200 W) and $P_{out}=P_{max}$ (for example, 375 W).

Figure 6:
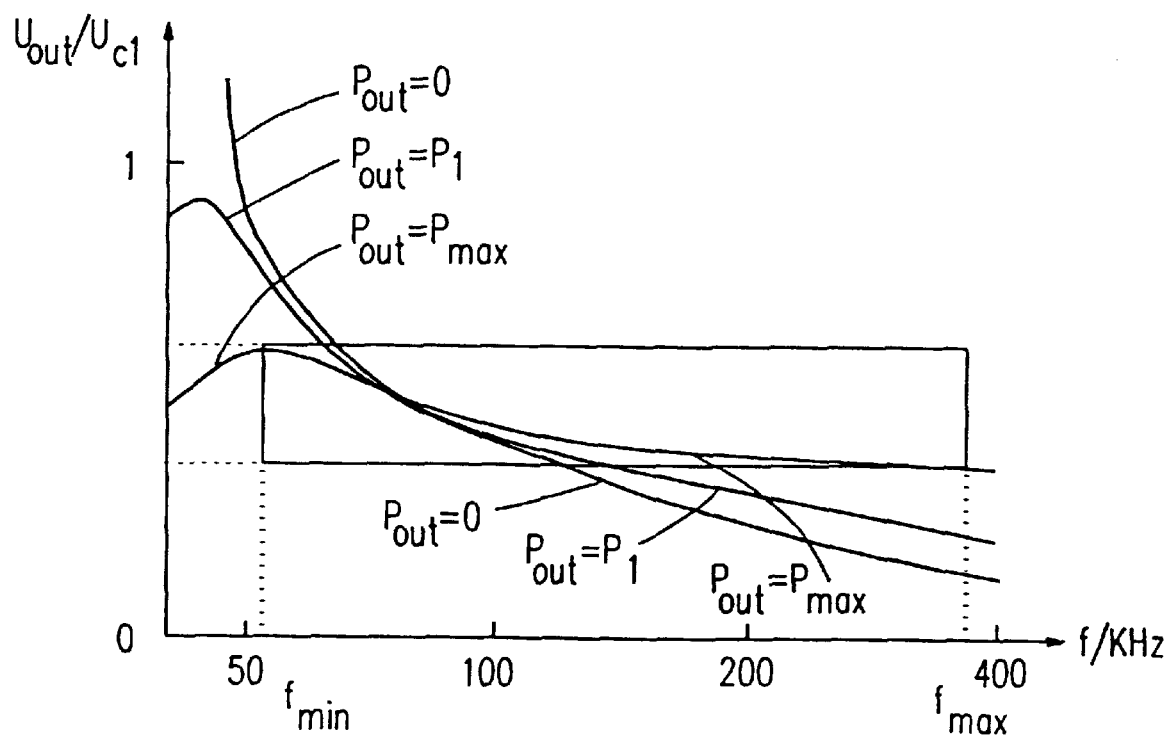
FIG. 6 shows a diagram for determining the operating range of the switching frequency of the switching means in the AC/DC converter.

FIG. 4 shows that the voltage $U_{C1}$ is above the maximum value of the AC input voltage $U_{in}$ in an AC/DC converter with a no-load at its output ($I_{out}=0$, $P_{out}=0$). Moreover, the voltage swing of the voltage $U_{43}$ is indicated by way of the reference $2 \times U_{43,peak}$. In this operating state, the ratio $U_{out}/Uc_{c1}$ is reduced because of the increased voltage $U_{c1}$. In FIG. 6, this corresponds to an operating point in the straight flattened regions of the curves shown. Accordingly, the operating frequency f, at which the transistors T1 and T2 are switched, is maximum in this operating state.

In the operating state shown in FIG. 5, however, the output power is maximum ($P_{out}=P_{max}$). In this operating state, the voltage $U_{C1}$ has decreased to the value of the voltage amplitude of the input voltage $U_{in}$. The capacitor voltage "floats" on the level of the amplitude of $U_{in}$. The peak value of the voltage $U_{43}$ has increased and is in the amplitude range of the input voltage $U_{in}$. While taking the characteristic curve for $P_{out}=P_{max}$ of FIG. 6 into account, the result of the decrease of the voltage $U_{C1}$ is that the operating frequency f to be adjusted is at $f=f_{min}$ in the range of the resonance overshoot. With respect to operating states with a smaller output power $P_{out}$, the operating frequency f to be adjusted has been reduced.

At a small output power $P_{out}$, the amplitude of the voltage at capacitor C2 falls. Connected therewith is a rise of the voltage $U_{C1}$ at the smoothing capacitor C1, which leads to an increase of the difference between the voltages $U_{23}$ and $U_{C1}$. This in turn, results in a decrease of the power transferred by the bridge rectifier 1 to the resonant converter 8. However, at a large output power $P_{out}$, the voltage $U_{c1}$ decreases and large voltage amplitudes occur in the resonant converter 8. The circuit arrangement for an AC/DC converter according to the invention has a self-stabilizing effect as regards fluctuations of the power $P_{out}$ supplied from the output of the AC/DC converter.

Figure 7A:
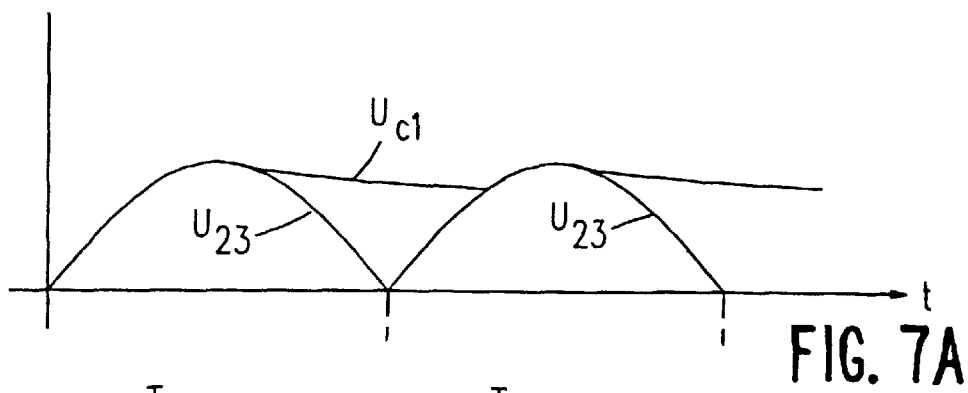
FIG. 7 shows voltage and current waveforms in the AC/DC converter.
Figure 7B:
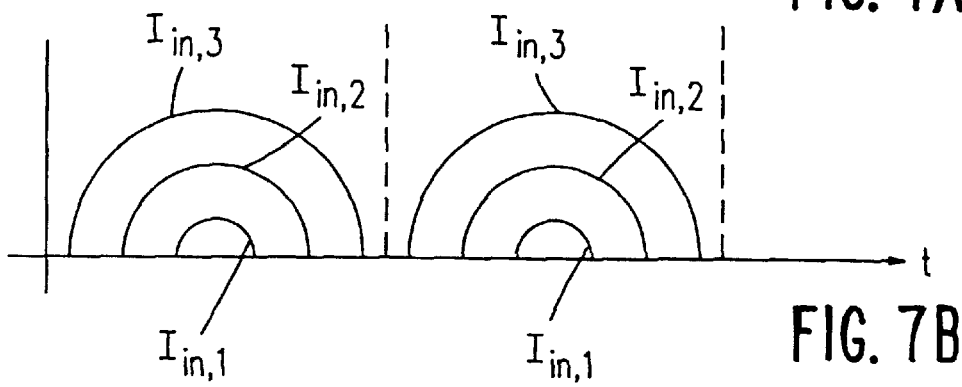

FIG. 7 shows the variation with respect to time of the input current $I_{in}$ for different values of the output power $P_{out}$. $I_{in,1}$ represents a small output power $P_{out}$, $I_{in,2}$ represents an average output power $P_{out}$ and $I_{in,3}$ represents a maximum output power $P_{out}$. For the sake of clarity, the variations with respect to time of the voltage $U_{23}$ and the capacitor voltage $U_{c1}$ are shown in the upper diagram of FIG. 7 above the several variations with respect to time for $I_{in}$. For a small output power, in accordance with the variation represented by $I_{in,1}$, a relatively small range is obtained in which an input current $I_{in}$ flows. The time range within which an input current $I_{in}$ flows increases with an increasing output power $P_{out}$.

Figure 8:
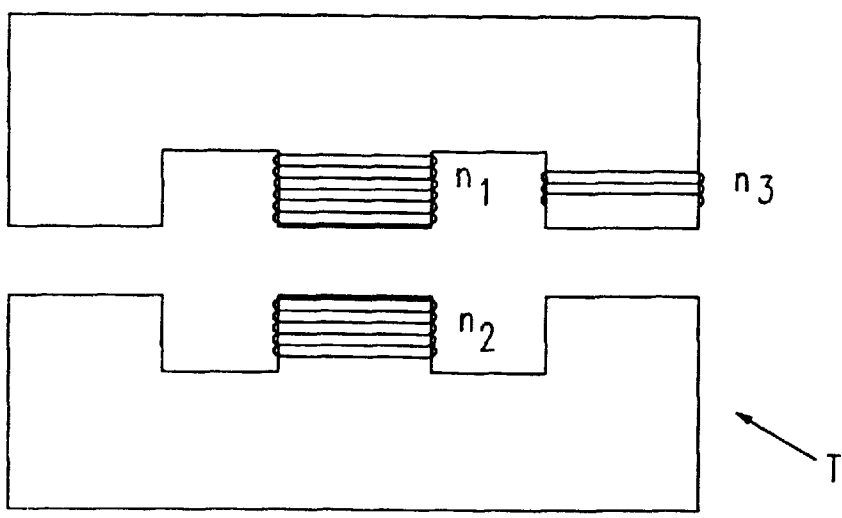
FIG. 8 shows an example of a transformer used.

FIG. 8 shows the basic structure of the transformer T. The windings n1 and n2 are magnetically arranged in series. A part of the magnetic flux flowing through these windings is passed through the winding n3. In an appropriate implementation of the transformer T, the booster inductance $L_{boost}$ is already realized by a leakage inductance of the transformer T, so that a separate component for the inductance $L_{boost}$ can be dispensed with.

What is claimed is:

1. An AC/DC converter comprising:
   a first rectifier arrangement for generating a rectified AC voltage from an AC voltage at an input of the AC/DC converter;
   a first smoothing capacitor arrangement for smoothing the rectified AC voltage;
   a resonant converter comprising resonant circuit elements for converting a voltage at an output the first smoothing capacitor arrangement into a DC output voltage at an output of the AC/DC converter;
   an inductive element arranged between the first rectifier arrangement and the first smoothing capacitor arrangement, said inductive element being magnetically coupled to an inductive resonant circuit element, and means for capacitive coupling a point between the first rectifier arrangement and the first smoothing capacitor arrangement to a point within the resonant converter, such that a potential modulated at an operating frequency of the resonant converter is fed back during operation of the AC/DC converter.

2. An AC/DC converter as claimed in claim 1, characterized in that said AC/DC converter further comprises booster means for causing the voltage at the output the first smoothing capacitor arrangement to be stepped up with respect to the rectified AC voltage supplied by the first rectifier arrangement.

3. An AC/DC converter as claimed in claim 1, characterized in that the booster means comprises a booster coil arranged in series with the inductive element arranged between the first rectifier arrangement and the first smoothing capacitor arrangement.

4. An AC/DC converter as claimed in claim 2, characterized in that said booster means has a booster inductance constituted by a leakage inductance of the inductive element arranged between the first rectifier arrangement and the first smoothing capacitor arrangement.

5. An AC/DC converter as claimed in claim 1, characterized in that the resonant converter comprises a transformer having a primary side and a secondary side, a second rectifier arrangement, and a second smoothing capacitor arrangement, said second rectifier arrangement and said second smoothing capacitor arrangement coupling the secondary side of the transformer to the output of the AC/DC converter, and switching elements, said switching elements, in a first switching state, applying the voltage at the output of the first smoothing capacitor arrangement, via the resonant circuit elements, to the primary side of the transformer, and, in a second switching state, (T1 non-conducting, T2 conducting) decoupling the first smoothing capacitor arrangement from the primary side of the transformer without the resonant circuit elements being decoupled from the primary side of the transformer.

6. An AC/DC converter as claimed in claim 1, characterized in that the inductive element is arranged in series with the capacitive coupling means.

7. An AC/DC converter as claimed in claim 5, characterized in that said capacitive coupling means comprises a capacitor having one terminal coupled to the point in the resonant converter which lies between the primary winding of the transformer and the capacitive resonant circuit element of the resonant converter, and another terminal coupled to the point (4) between the first rectifier arrangement and the first smoothing capacitor arrangement.

8. An AC/DC converter as claimed in claim 5, characterized in that said capacitive coupling means comprises a capacitor having one terminal coupled to the point in the resonant converter which lies between the primary winding of the transformer and another inductive resonant circuit element of the resonant converter, and another terminal connected to the point first rectifier arrangement and the first smoothing capacitor arrangement.

9. An AC/DC converter as claimed in claim 5, characterized in that said AC/DC converter further comprises control means for maintaining the DC output voltage constant by adapting a switching frequency of the switching means.

* * * * *